United States Patent [19]
Frielingsdorf

[11] 4,166,625
[45] Sep. 4, 1979

[54] AUTOMATIC STOP FOR TURNTABLE TONE ARM

[75] Inventor: Frank J. Frielingsdorf, Port Jefferson, N.Y.

[73] Assignee: Pickering & Company, New York, N.Y.

[21] Appl. No.: 917,531

[22] Filed: Jun. 21, 1978

[51] Int. Cl.² ............................................. G11B 3/10
[52] U.S. Cl. .................................. 274/23 R; 274/1 L
[58] Field of Search ...................... 274/23 R, 1 L, 13 R

[56] References Cited
FOREIGN PATENT DOCUMENTS 2413972  9/1974  Fed. Rep. of Germany ......... 274/23 R
2450958  6/1976  Fed. Rep. of Germany ........... 274/1 L

*Primary Examiner*—Harry N. Haroian
*Attorney, Agent, or Firm*—Kane, Dalsimer, Kane, Sullivan & Kurucz

[57] ABSTRACT

A phonograph turntable having a tone arm cueing mechanism is provided with a switch arrangement for activating the cueing mechanism and stopping the phonograph when the tone arm reaches the end of the information bearing groove of a record. The switch arrangement includes a reed switch and magnet one of which is mounted to move with the tone arm. The position of at least one of the reed switch and magnet may be varied to alter the position at which the cueing mechanism is activated.

6 Claims, 8 Drawing Figures

AUTOMATIC STOP FOR TURNTABLE TONE ARM

BACKGROUND OF THE INVENTION

The present invention rleates to phonograph turntables and in particular to automatic controls for such turntables.

In automatic turntables, means are provided to lift the phonograph tone arm from a record after the tone arm cartridge has tracked all the information bearing grooves of a record. The mechanism for such tone arms has generally consisted of a segmented gear which travels with the tone arm. As the tone arm approaches the center of rotation the record supporting platter, the segmented gear meshes with another gear to set in motion the lifting of the tone arm from the record surface and shut down of the turntable.

It is important that the tone arm cartridge be lifted from the record as soon as possible after it has completed tracking the record grooves since the center of the record discs almost always contains a label which can do damage to the cartridge stylus. In addition, when the tone arm reaches the center of the record and is no longer tracking an information groove, it very often skates across the center portion of the record and may bang against the turntable spindle thereby posing the possibility of damage being done to the tone arm and/or cartridge.

The principal shortcoming of mechanisms heretofore available for lifting the tone arm from the record at the completion of play is that by their design a certain amount of skating across the record label must occur before the lifting mechanism is actuated. This is due at least partly to the fact that the mechanism must operate regardless of the record size.

Another shortcoming of such prior art devices is that the tone arm must carry with it at least a portion of the actuating mechanism thereby effecting the response of the system.

In view of the above, it is the principal object of the present invention to provide an improved mechanism for use with a phonograph turntable for automatically lifting the turntable tone arm from a record after the tone arm has traversed a preselected distance along the record grooves.

A further object is to provide such a mechanism which may be varied as desired to have the lifting operation initiated when the tone arm reaches any preselected position.

A still further object is to provide a mechanism which is relatively simple and inexpensive to construct and which may be easily adapted for use in conventional turntables without requiring any major redesign of the turntable.

SUMMARY OF THE INVENTION

The above and other beneficial objects and advantages are attained in accordance with the present invention by providing an improved phonograph turntable comprising a base and having a record support platter mounted for rotation on the base. The tone arm support extends outwardly from the base and a tone arm is pivotally mounted at one end to the support. The phonograph cartridge and stylus assembly is mounted to the other end of the tone arm. A cueing post is mounted for vertical movement beneath the tone arm. The cueing post includes a horizontal cradle affixed to its top end adapted to engage the tone arm at any point in the arc of travel of the tone arm. Control means are provided for shifting the cueing post vertically so that the cradle may engage the tone arm and lift it from a record surface when required. Switch means for actuating the cueing post shift include a reed switch mounted to either the tone arm support or tone arm and a magnet mounted to the other member. When the reed switch and magnet are aligned, the magnet serves to actuate the elements of the reed to close the switch thereby actuating the switch means for the cueing post.

At least one of the magnet and reed switch is rotatably mounted with respect to the other so that the position at which the reed switch and magnet align may be altered as desired.

DETAILED DESCRIPTION OF THE PREFERRED EMBODIMENT

Figure 1:
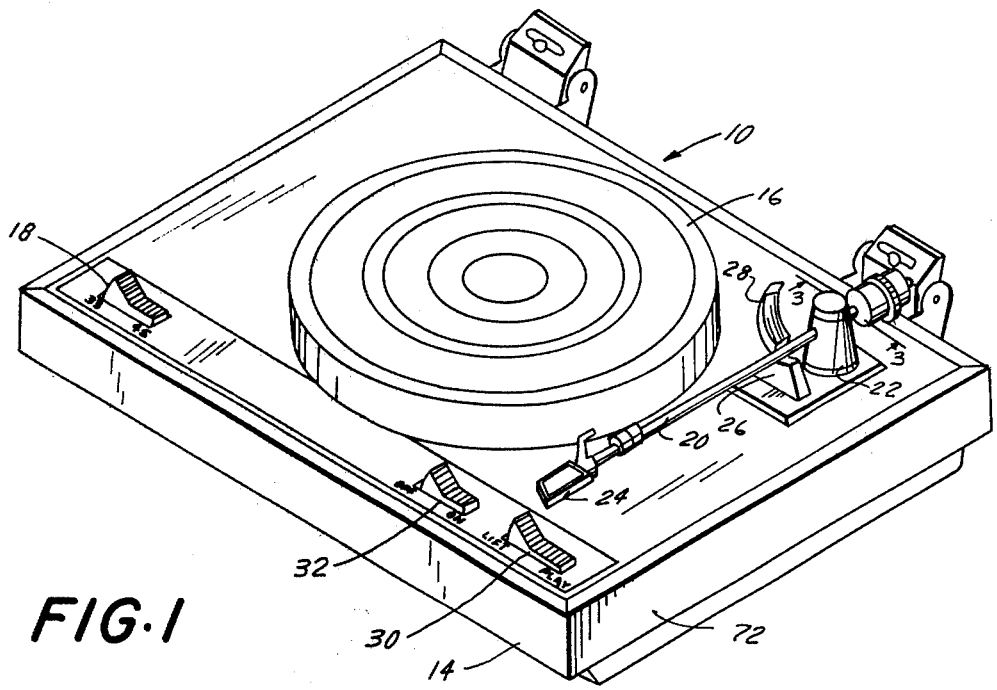
FIG. 1 is a perspective view of a phonograph turntable incorporating the improvement of the present invention.

Reference is now made to the drawings and to FIG. 1 in particular wherein a phonograph turntable 10 in accordance with the present invention is depicted. The turntable comprises a base 12 contained within a housing 14. A record support platter 16 is mounted for rotation to a top surface of the base. Platter 16 is driven by a belt which, in turn, is driven by a motor neither of which is shown. The speed of the platter may be varied to accommodate 33⅓ rpm or 45 rpm records by suitably depressing one side or the other side of a toggle switch 18 mounted on top of the base.

A tone arm 20 is pivotally mounted at one end to a tone arm support 22 which extends upwardly from base 12. A cartridge assembly 24 including a record tracking cartridge is mounted to the opposite end of tone arm 20.

A cueing post 26 is mounted for vertical movement within base 12. A cradle 28 is mounted to the top end of post 26 and underlies the tone arm. In operation, the tone arm may be psoitioned over any desired portion of a record on platter 16. Post 26 is controlled by toggle switch 30. When the toggle "LIFT" side is depressed, the post is raised so that the tone arm and hence the cartridge 24 is lifted off a record surface by cradle 28. When the "PLAY" side of the toggle is pressed, the post moves downwardly to a position out of engagement with the tone arm thereby permitting the stylus cartridg3 24 to track the grooves of the record. Movement of the cueing post is highly damped so that the downward movement of the stylus onto the record is gradual and gentle.

The motor for the platter drive is governed by toggle switch 32 which is also mounted on the face of base 12.

Figure 3:
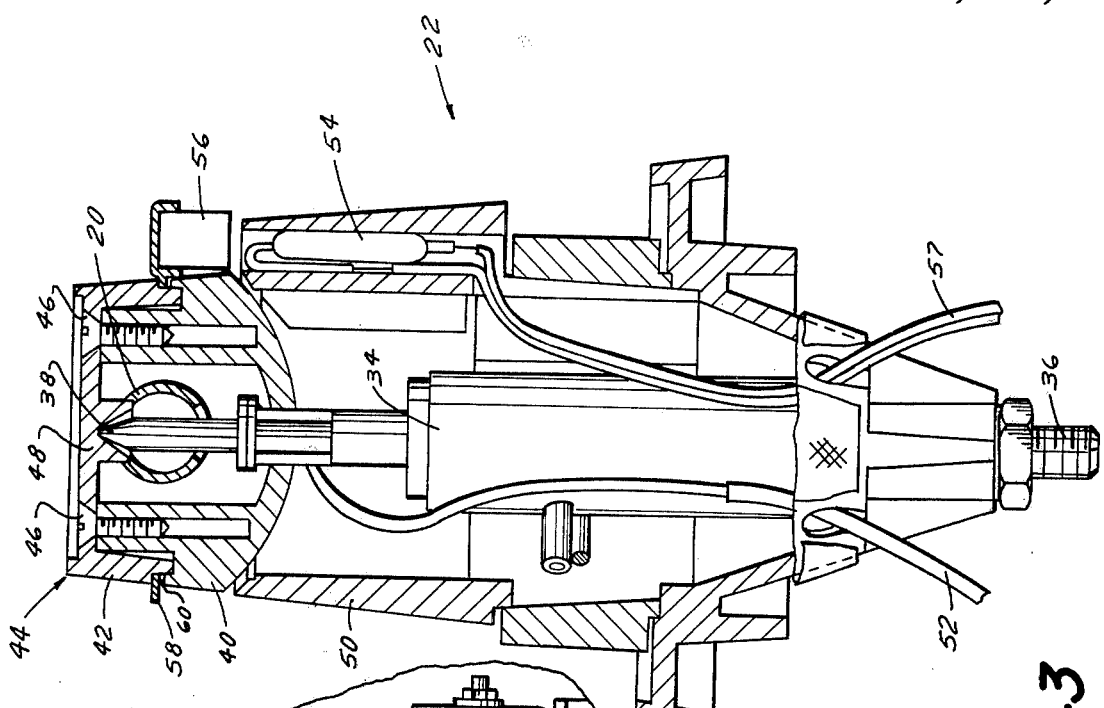
FIG. 3 is a fragmentary sectional view taken along reference lines 3—3 of FIG. 1 in the direction indicated by the arrows depicting the turntable tone arm and tone arm support mechanism.

Referring to FIG. 3, it can be seen that the tone arm post 22 consists of an elongated member 34 secured at one end 36 to the base of the turntable. The opposite end of member 36 terminates in a pointed tip 38. Tone arm 20 is captured between the two sections 40 and 42 of a cap 44. Sections 40 and 42 are secured to each other by screws 46. Cap 44 defines a race 48 for tip 38. The entire cap 44 rotates with tone arm 20 about tip 38. A fixed housing 50 surrounds the elongated member 34. Electrical conductors 52 pass through tone arm 20 and housing 50 to interconnect cartridge 24 with the output terminal of the turntable.

In accordance with the present invention, a reed switch 54 is mounted to housing 50. A magnetic member 56 is mounted to cap 44 to rotate with the cap. Reed switch 54 is positioned so that when magnet 56 and switch 54 are aligned, the magnet serves to close the contacts of switch 54. Reed switch is connected through leads 57 to a solenoid control circuit which will be described forthwith.

Figure 7:
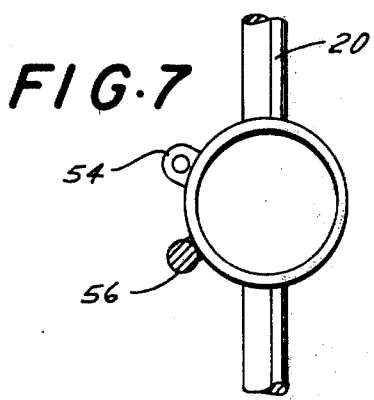
FIG. 7 is a fragmentary top plan view of a phonograph tone arm and support in a normal rest position; and, FIG. 8 is a view similar to FIG. 7 showing the position of the tone arm at the end of a record.
Figure 8:
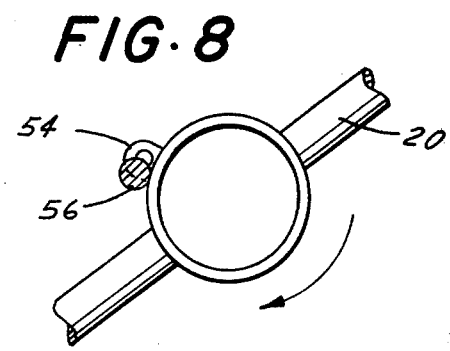

Magnet 56 is contained at one end of a "C" shaped member 58 which snap fits for rotational movement within a groove 60 defined between portions 40 and 42 of cap 44. The "C" member is free to rotate within the groove so that the position at which magnet 56 and reed switch 54 will align may be varied with respect to the position of tone arm 20. This may best be appreciated with regard to FIGS. 7 and 8. FIG. 7 depicts the relative position of tone arm 20, magnet 56 and switch 54 when the tone arm is in a position shown in FIG. 1. As the tone arm traverses the grooves of a record on platter 16, it eventually assumes the position shown in FIG. 8 wherein magnet 56 is aligned vertically over switch 54. In this position, the magnet will serve to close the reeds of the switch thereby providing a conductive path through the switch. The position at which magnet 56 overlies reed switch 54 may be altered by simply rotating the "C" shaped member 58 as desired.

Figure 2:
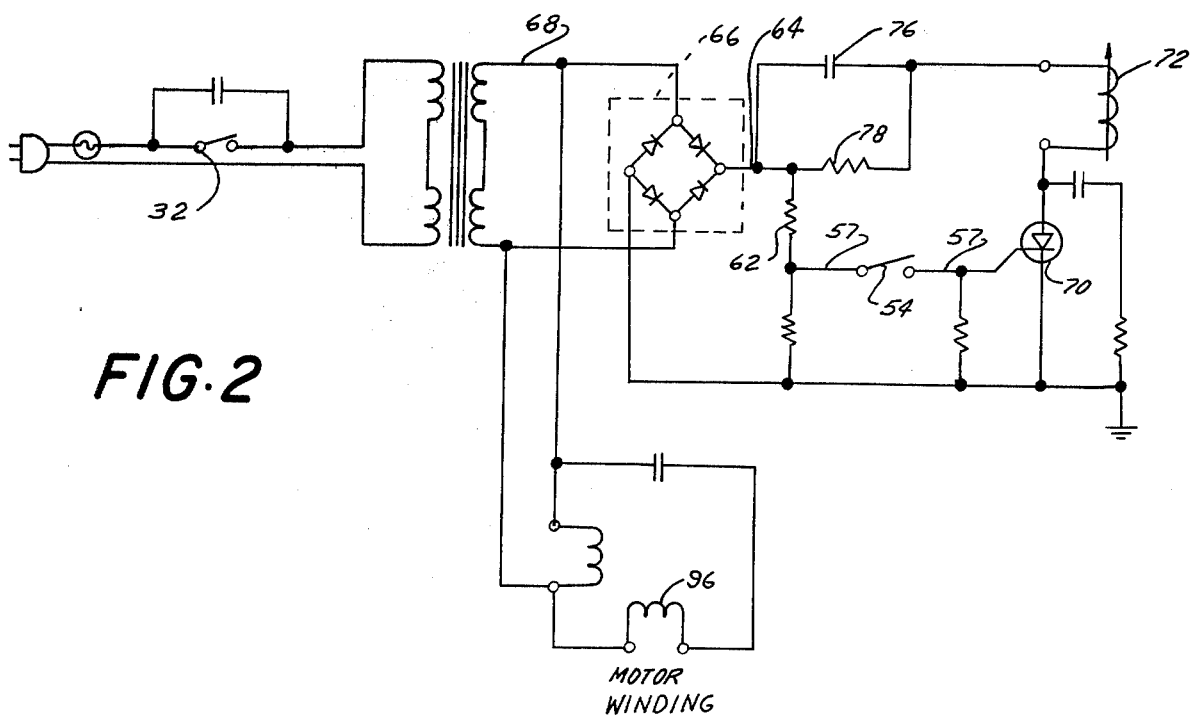
FIG. 2 is a schematic drawing of the electrical circuit for the turntable.

Referring briefly to FIG. 2, it can be seen that switch 54 is connected through resistor 62 to the output terminal 64 of a rectifier 66 which, in turn, is connected to an input transformer 68. When switch 54 closes biasing current is applied to SCR 70 thereby allowing current to flow through the winding 72 of solenoid 74 (see FIGS. 4 and 6). Winding 72, in turn, is connected to the output 64 of rectifier 66 through capacitor 76. The voltage applied to solenoid 72 is limited by bleed resistor 78 shunted across capacitor 76.

Figure 4:
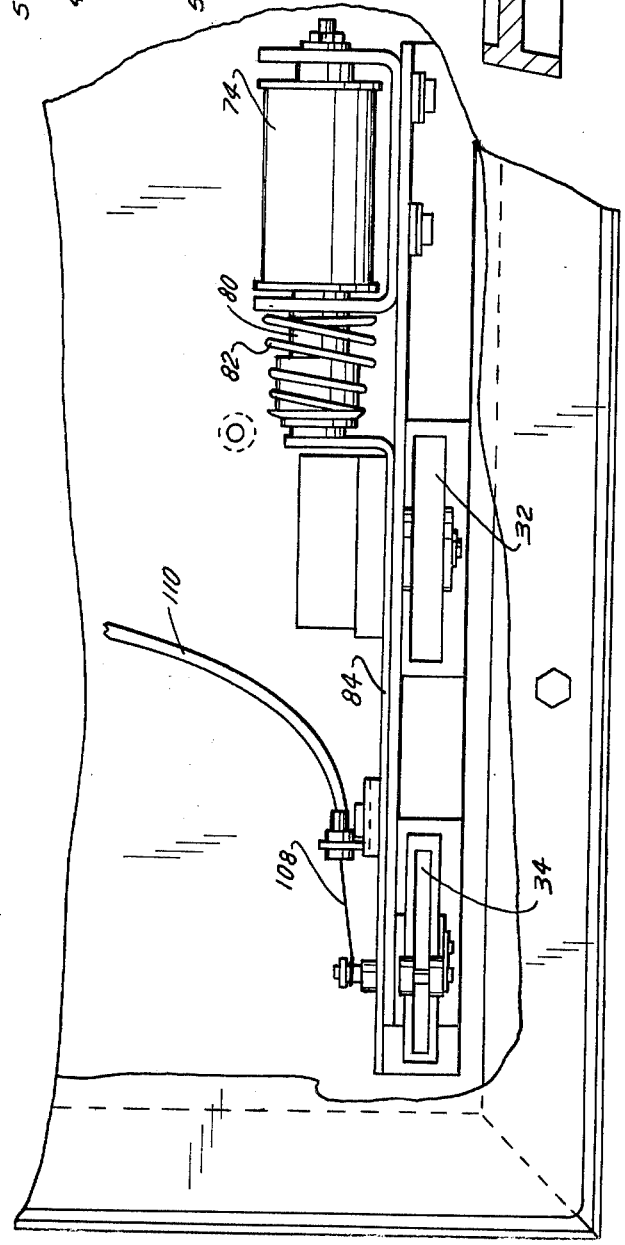
FIG. 4 is a fragmentary plan view of the cueing mechanism switch means.
Figure 6:
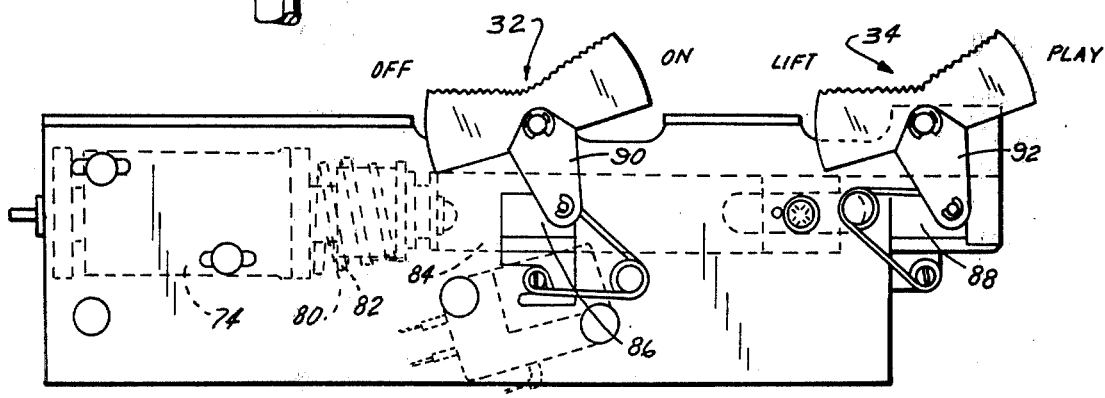
FIG. 6 is a side elevational view of the mechanism of FIG. 4.

Referring to FIGS. 4 and 6, it can be seen that solenoid 74 includes an inner core 80 that operates against spring 82 when winding 72 is excited. The inner core moves outwardly (away from solenoid 74) and then is returned to its original position by spring 82. A lever 84 is mounted to the forward end of core 80. The lever includes a pair of cutouts 86 and 88 through which the base portions 90 and 92 of switches 32 and 34 respectively extend. Slots 86 and 88 are so proportioned that when switches 32 and 34 are in the "ON" and "PLAY" positions respectively, members 90 and 92 engage the slots with the lever in the retracted position. When the solenoid is excited, the lever shifts to the right (see FIG. 6) thereby causing toggles 32 and 34 to shift to the "OFF" and "LIFT" positions. The lever then returns to the retracted position, the operation of spring 82 so that an operator may press toggles 32 and 34 to once again place the turntable in the "ON" and "PLAY" positions.

As can be seen from FIG. 2, when toggle 32 is in the OFF position, current is removed from the motor winding 96 for the turntable.

Figure 5:
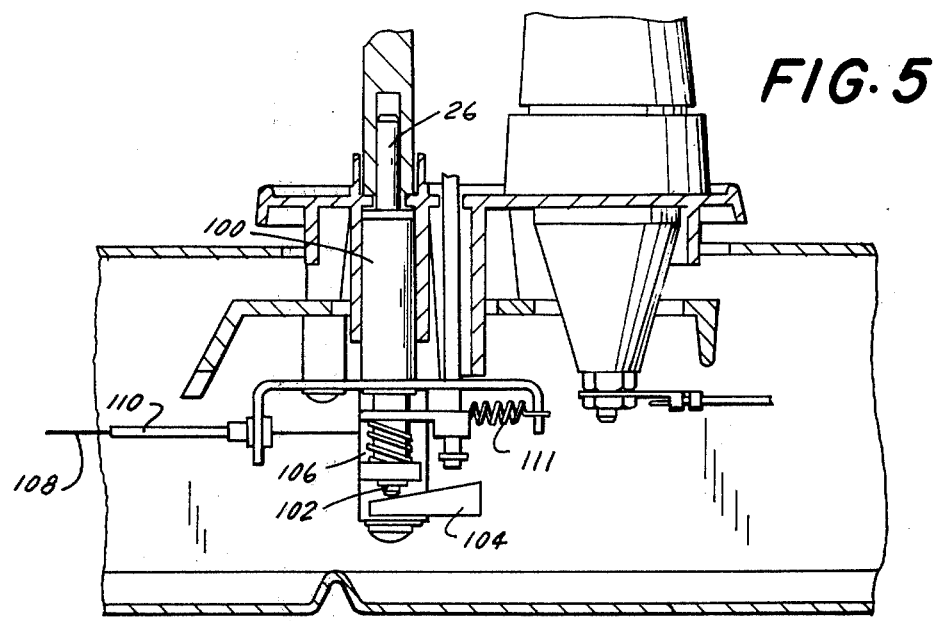
FIG. 5 is a fragmentary side elevational sectional view of the cueing mechanism.

Referring now to FIGS. 4 and 5, it can be seen that cueing post 26 extends through a cylinder 100 containing silicon or some other appropriate damping fluid and terminates at its lower end 102 beyond the cylinder. End 102 rides on a circular inclined cam 104 which is mounted for rotational movement. A portion 106 of cam 104 is connected through the interior member 108 of choke cable 110 to switch 34. Thus, when the PLAY side of toggle 34 is depressed, cable 108 causes the rotation of the inclined section of cam 104 releasing end 102 of post 26 downward thereby permitting the cradle 28 to lower the tone arm 20 onto a record on the turntable platter. Internal friction of toggle 34 serves to counteract a return spring 111. When the LIFT side of toggle 34 is depressed, spring 111 is released returning cam 104 to its original position and post 26 will then move upward. The movement of post 26 is very gradual under the damping action of the fluid contained within cylinder 70.

By adjusting the position of magnet 56 with respect to reed switch 54 and system can be adjusted so that at any point in the travel of the tone arm the reed switch and hence solenoid 74 will be activated. This is particularly important if the turntable is to be used for both 33⅓ and 45 rpm records.

Thus, in accordance with the above, the aforementioned objects are effectively attained.

Having thus described the invention, what is claimed is:

1. A phonograph turntable comprising: a base; a record support platter mounted for rotation on said base; drive means for said platter; a tone arm support extending upwardly from said base; a tone arm having a first end pivotally mounted to said support and a second end; a cueing post mounted for vertical movement beneath said tone arm, a horizontal cradle affixed to the top end of said post; means for shifting said cueing post vertically; and, switch means for actuating said last mentioned means including a reed switch mounted to one of said tone arm support and tone arm and a magnet mounted to the other of said tone arm support and tone arm whereby said switch means are actuated when said reed switch and magnet are aligned.

2. The turntable in accordance with claim 1 wherein at least one of said magnet and reed switch is rotatably mounted whereby the position of alignment of said magnet and reed switch may be varied.

3. The turntable in accordance with claim 1 wherein said shifting means comprises an arcuate and inclined cam positioned under said post and mounted for rotation, said post having a bottom end following said cam, a toggle switch mounted to said base, and a cable extending between said toggle switch and cam whereby shifting of said toggle switch causes said cam to rotate and hence said post to shift vertically.

4. The turntable in accordance with claim 3 wherein said switch means includes means for tripping said toggle switch.

5. The turntable in accordance with claim 4 wherein said tripping means comprises: a solenoid having a core, a lever connected to said solenoid core and adapted to move therewith, said lever being positioned in the path of movement of said toggle switch, said solenoid being actuated by said reed switch.

6. The turntable in accordance with claim 1 wherein said switch means also controls the power for said platter drive means.

* * * * *